(12) United States Patent
Picot

(10) Patent No.: US 7,845,478 B2
(45) Date of Patent: Dec. 7, 2010

(54) VIBRATION DAMPING DEVICE

(75) Inventor: Pascal Picot, Brie Conte Robert (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/331,935

(22) Filed: Jan. 13, 2006

(65) Prior Publication Data

US 2006/0169558 A1 Aug. 3, 2006

(30) Foreign Application Priority Data

Feb. 2, 2005 (FR) .................................. 05 01174

(51) Int. Cl.
*F16F 7/10* (2006.01)

(52) U.S. Cl. .................... 188/379; 188/380; 188/73.35; 188/73.37; 188/378

(58) Field of Classification Search ................. 188/379, 188/380
See application file for complete search history.

(56) References Cited

U.S. PATENT DOCUMENTS

| 3,242,791 | A | * | 3/1966 | Smith | .......................... | 188/379 |
| 3,319,918 | A | * | 5/1967 | Rapata | ........................ | 248/239 |
| 3,522,864 | A | * | 8/1970 | Richter | ........................ | 188/380 |
| 4,306,708 | A | * | 12/1981 | Gassaway et al. | ......... | 267/141.3 |
| 4,420,989 | A | * | 12/1983 | Finkle | ........................ | 74/551.2 |
| 4,612,429 | A | * | 9/1986 | Milianowicz | ................ | 200/288 |
| 4,641,732 | A | * | 2/1987 | Andry | ......................... | 188/379 |
| 5,487,375 | A | * | 1/1996 | McDonald, Jr. | ............... | 124/89 |
| 5,803,442 | A | * | 9/1998 | Despres et al. | .............. | 267/168 |
| 7,219,883 | B2 | * | 5/2007 | Huprikar | ..................... | 267/293 |

FOREIGN PATENT DOCUMENTS

| DE | 2914629 | * | 4/1979 |
| DE | 19524948 | * | 7/1995 |
| FR | 2836532 | * | 8/2003 |

* cited by examiner

*Primary Examiner*—Bradley T King
*Assistant Examiner*—James K Hsiao
(74) *Attorney, Agent, or Firm*—Michael Best & Friedrich LLP

(57) ABSTRACT

An anti-vibration device "D" having a shank (10) fixed to a structure (S) and a mass (4) retained on the shank (10) that is pressed by a spring (8) against the structure (S) with a predetermined force. The spring (8) increases the friction forces between the structure (S) and the mass (4) to deaden vibrations of the structure (S).

18 Claims, 4 Drawing Sheets

VIBRATION DAMPING DEVICE

The present invention relates mainly to an anti-vibration device and to a structure comprising such a device, the structure in particular being a disk brake or a drum brake.

BACKGROUND OF THE INVENTION

In the automotive field, the comfort of the passengers of a motor vehicle is a major concern, this concern manifesting itself in a fight against noise, particularly the operating noise of the various parts that make up a motor vehicle. The braking device, particularly the brakes, disk brakes and/or drum brakes, positioned at the wheels are sources of noise. Because of their arrangement and the way in which they are stressed, they are very sensitive to motor vehicle vibration. The brakes are liable to start to vibrate and to generate rather a loud noise, and because of the frequency of braking actions this carries the risk of becoming a major annoyance.

Document FR 0 202 442 discloses an anti-vibration device comprising a mass slideably mounted along a screw screwed into the structure liable to vibrate and a spring mounted to provide reaction between one end of the screw and the mass and exerting a determined force on the mass so as to press the mass against the structure. As a result, when the mass starts to move, it rubs against the surface of the structure and deadens the vibrations. The mass is mounted with clearance around the screw. This device is satisfactory although its effectiveness could usefully be improved.

SUMMARY OF THE INVENTION

It is therefore an object of the present invention to offer a vibration-deadening device that is highly effective and simple in design.

Another object of the present invention is to offer a structure, particularly a motor vehicle brake, that is silent and provides good driving safety.

These objects are achieved by an anti-vibration device comprising a mass, an element for fixing the mass to a structure the potential vibrations of which need to be damped, a means for adjusting the force with which the mass rubs against the structure and means for causing the mass to collaborate in friction with the fixing means.

In other words, as the fixing means is an element entirely separate from the structure and fixed rigidly thereto, the present invention uses the fixing means as part of the structure in order to increase the amount of contact between the mass and the structure, thus increasing the friction forces between the structure and the mass. Vibrations are dissipated through the structure more quickly.

The main subject of the present invention is an anti-vibration device able to be fixed to a structure, comprising a means of fixing the said device to the said structure, a mass and a means able to press the said mass against the structure with a predetermined force, characterized in that it also comprises means intended to increase the friction forces between the fixing means and the mass.

Another subject of the present invention is an anti-vibration device, characterized in that the mass is mounted around the fixing means and in that the means intended to increase the friction forces between the fixing means and the mass comprise at least one pair of opposing surfaces borne one by the mass and one by the fixing means.

Another subject of the present invention is a device, characterized in that the said surfaces are formed by a screw thread formed on the fixing means and by a tapped thread formed in the mass.

Another subject of the present invention is a device, characterized in that the means applying a predetermined force to the mass to bring it into contact with the structure is an elastic means.

Another subject of the present invention is an anti-vibration device, characterized in that the elastic means is a helical spring.

Another subject of the present invention is an anti-vibration device, characterized in that the fixing means is a screw screwed by a first end into the said structure and equipped at a second, opposite, longitudinal end, with a head, and in that the helical spring is mounted to provide reaction between the nut and the mass.

Another subject of the present invention is an anti-vibration device, characterized in that the screw comprises a threaded shank, the head being formed of a nut mounted at the second longitudinal end, so that the load on the spring can be adjusted.

Another subject of the present invention is a motor vehicle brake comprising a body, a means of pressing at least one friction pad against an element made to rotate by the wheel of the motor vehicle, an anti-vibration device fixed on the body, characterized in that the anti-vibration device is a device according to the invention.

Another subject of the present invention is a brake, characterized in that the brake is a disk brake, in that the element made to rotate is a brake disk and in that the anti-vibration device is fixed to a carrier and/or a caliper of the disk brake.

Another subject of the present invention is a brake, characterized in that the brake is a drum brake, in that the element made to rotate is a drum and in that the anti-vibration device is fixed to the plate.

The present invention will be better understood with the aid of the description which will follow and of the attached figures.

DETAILED DESCRIPTION OF THE INVENTION

Figure 1:
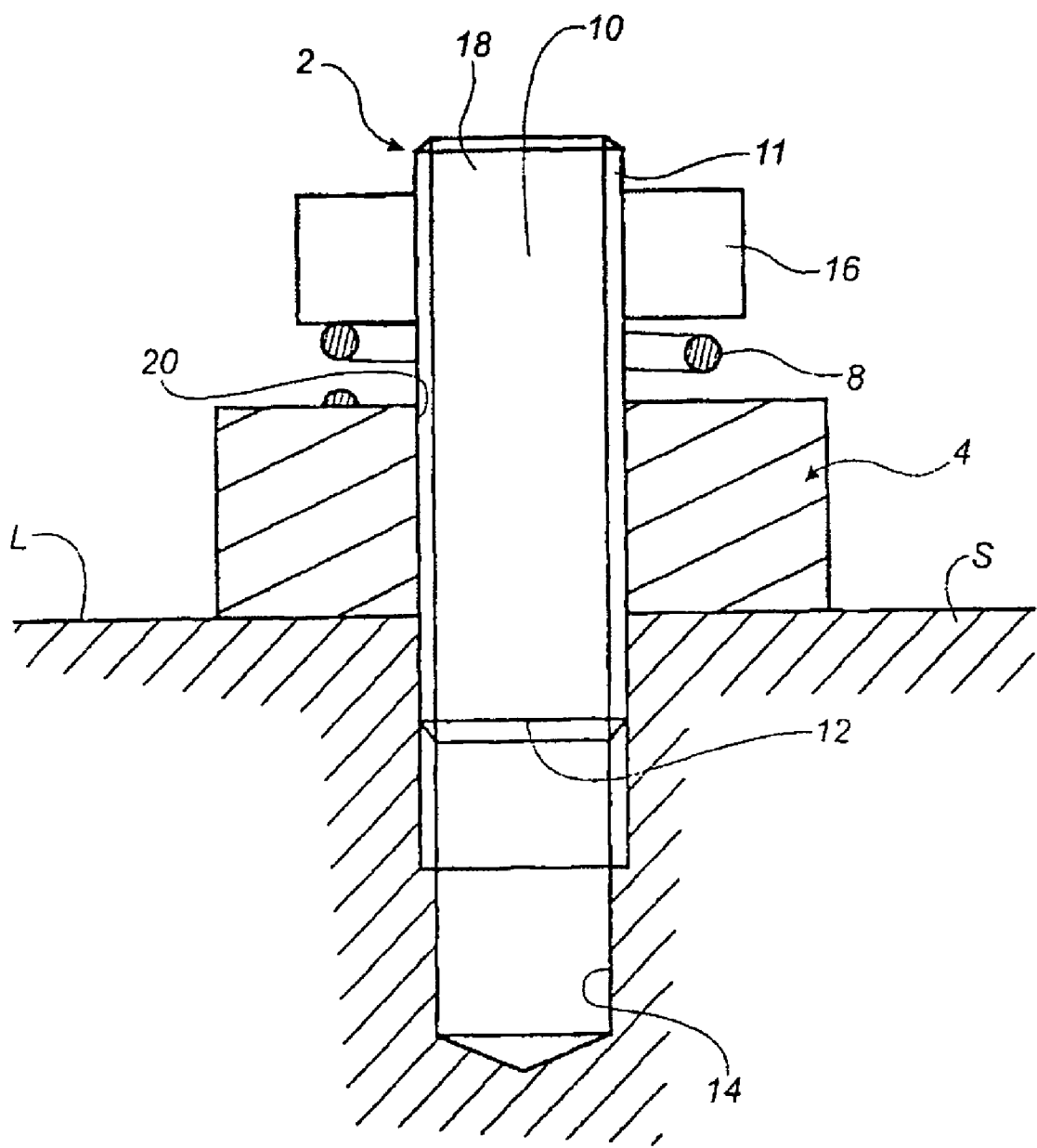
FIG. 1 is a view in axial section of one exemplary embodiment of an anti-vibration device according to the present invention.

FIG. 1 shows an anti-vibration device D according to the present invention comprising a fixing means 2 for fixing it to a structure S, a mass 4 kept in contact with a surface L of the structure S by a pressing means 8 mounted to provide reaction between the fixing means 2 and the mass 4.

In the example depicted, the fixing means is a shank 10 provided with a screw thread 11 along its entire length. The shank 10 is intended to be screwed via a first longitudinal end 12 into a tapped hole 14 in the structure S. A nut 16 is screwed onto a second longitudinal end 18 of the shank 10, the opposite end to the first end. The nut is advantageously prevented from turning for example by an adhesive, to prevent it from becoming detached from the shank.

Of course, provision could be made for the shank 10 to be bonded or welded to the structure.

In the example depicted, the mass 4 is of annular shape pierced with a passage 20 so that the mass 4 can be mounted around the shank 10. According to the present invention, the device comprises means for increasing the friction forces between the shank of the fixing means and the mass. The means intended to increase the friction forces between the fixing means and the mass comprise at least one pair of opposing surfaces intended to come into contact with one another, one surface of the pair being borne by the mass and the other surface of the pair being borne by the fixing means. In the example depicted, the pairs of surfaces are formed by a tapped thread 21 and the screw thread 11 of the fixing means.

Figure 2:
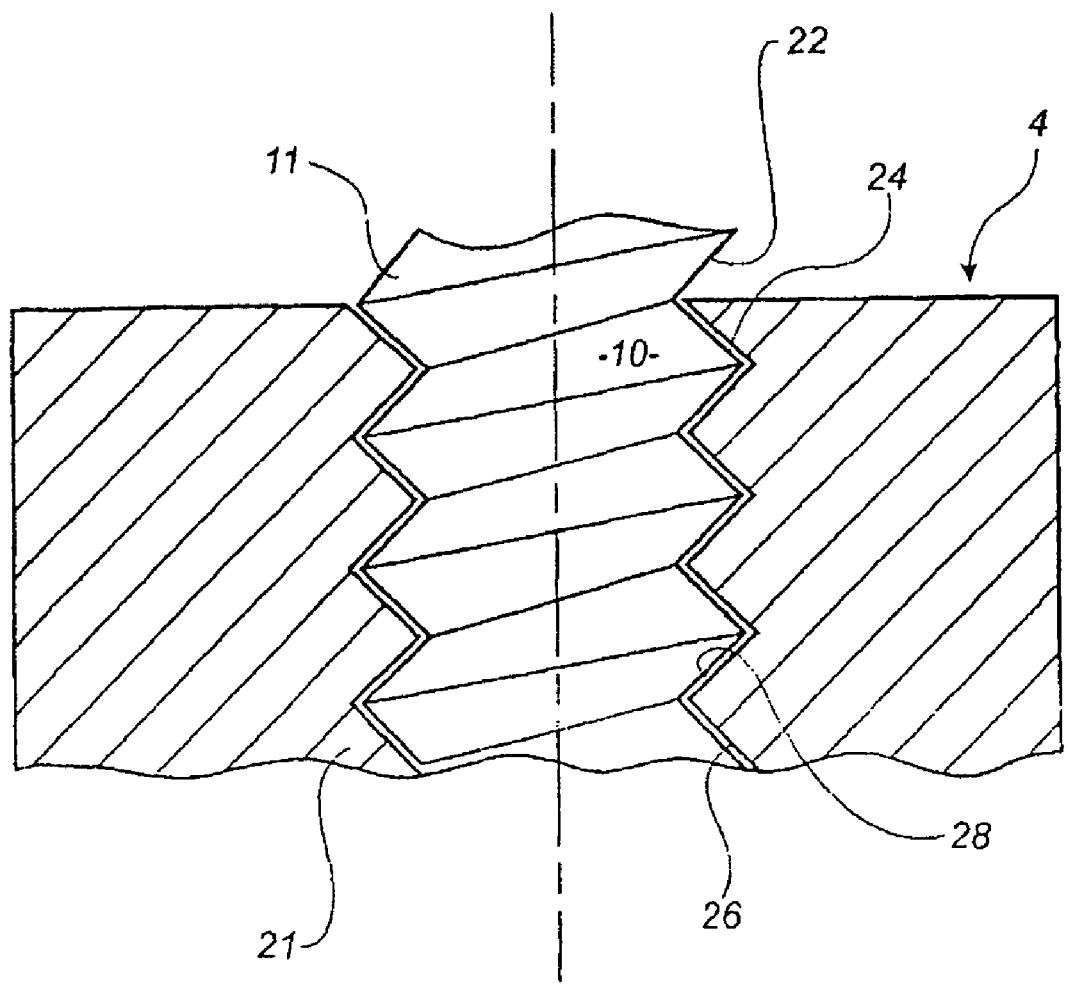
FIG. 2 is a detailed view of FIG. 1.

FIG. 2 shows the screw thread 11 comprising a first helical surface 22 and a second helical surface 24 which face a third and fourth 26, 28 helical surface forming the tapped thread 21, respectively. The first pair of surfaces comprises the first surface 22 and the third surface 26 and the second pair comprises the second surface 24 and the fourth surface 28.

As the shank 10 is rigidly fixed to the structure S, it is also set in vibration when the structure vibrates and the collaboration between the shank 10 and the mass 4 has the effect of reducing the vibrations of the structure S.

Of course, other means for causing the shank and the mass to collaborate in friction may be envisaged, for example a mass comprising a stepped passage 20 collaborating with a stepped shank 10.

An advantage of the present invention is that it allows the force exerted by the spring on the mass to be adjusted and therefore allows the anti-vibration device to be tailored to suit the resonant frequencies of the structure since the distance between the nut and the surface of the structure can be adjusted because of the screw-fastening.

Provision could be made to use a screw in place of the threaded shank/nut assembly, although the ease of tuning the device for frequency would then be lost.

The anti-vibration device according to the present invention is advantageously used to limit the vibrations of a motor vehicle brake.

Figure 3:
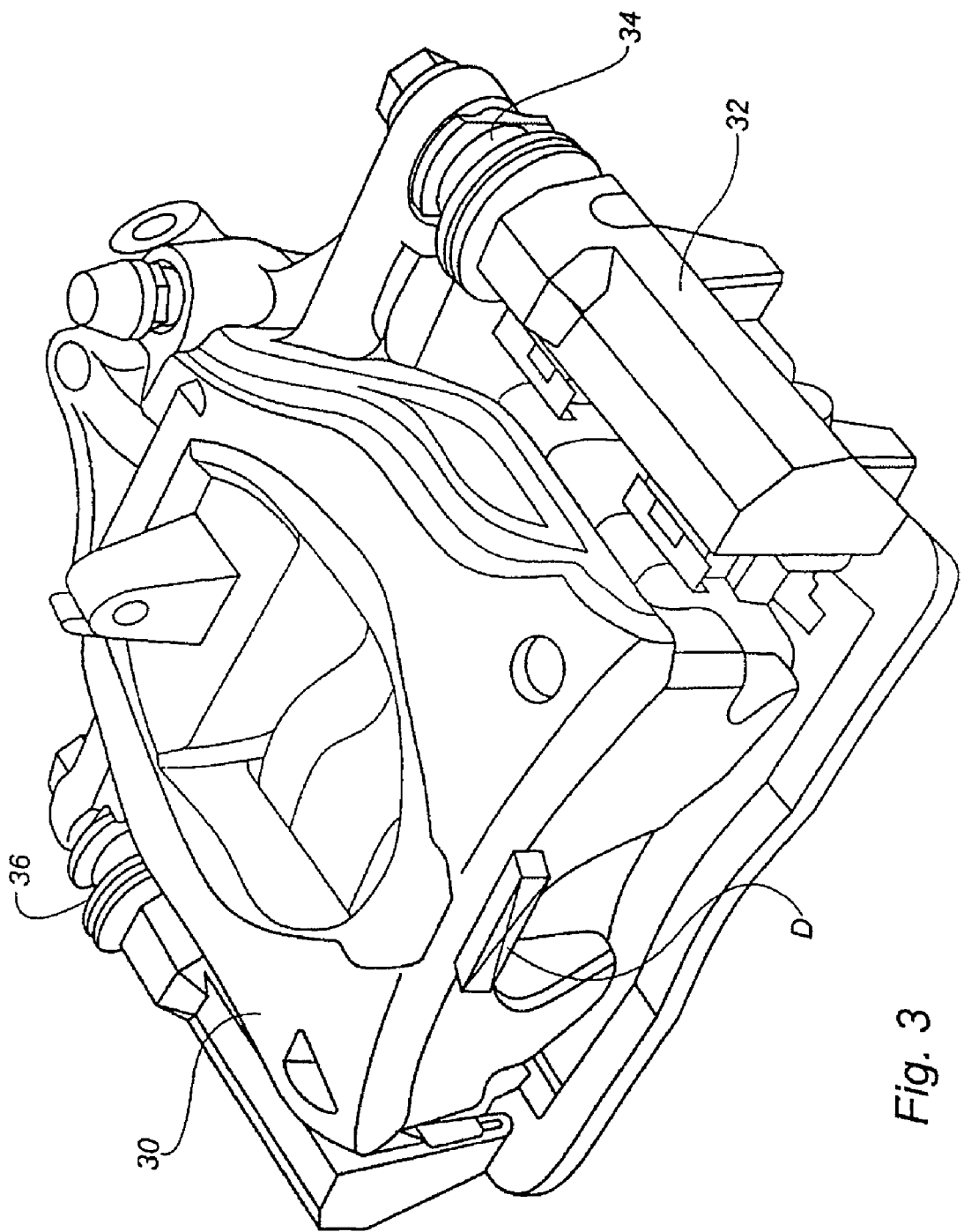
FIG. 3 is an overall view of a disk brake equipped with a device according to the present invention.

FIG. 3 shows an example of a disk brake according to the present invention, comprising a caliper 30 able to slide via guide pins 34, 36 with respect to a carrier 32 mounted fixedly on a stub axle of a motor vehicle. A piston slideably mounted in the caliper and actuated for example by a pressurized hydraulic fluid is intended to move at least a first friction means towards a first face of a brake disk, a second friction means being moved against a second face of the disk through the sliding of the caliper relative to the carrier.

The anti-vibration device D according to the present invention is mounted for example on the caliper and/or on the carrier, advantageously on the parts experiencing the greatest-amplitude vibrations, for example on the nose of the caliper. In FIG. 3, the device schematically depicted is mounted on the nose of the caliper.

The anti-vibration device is, for example fixed to one end of a guide pin.

Of course, the present invention is just as applicable to a so-called fixed disk brake, comprising at least two pistons positioned one on each side of the brake disk.

Figure 4:
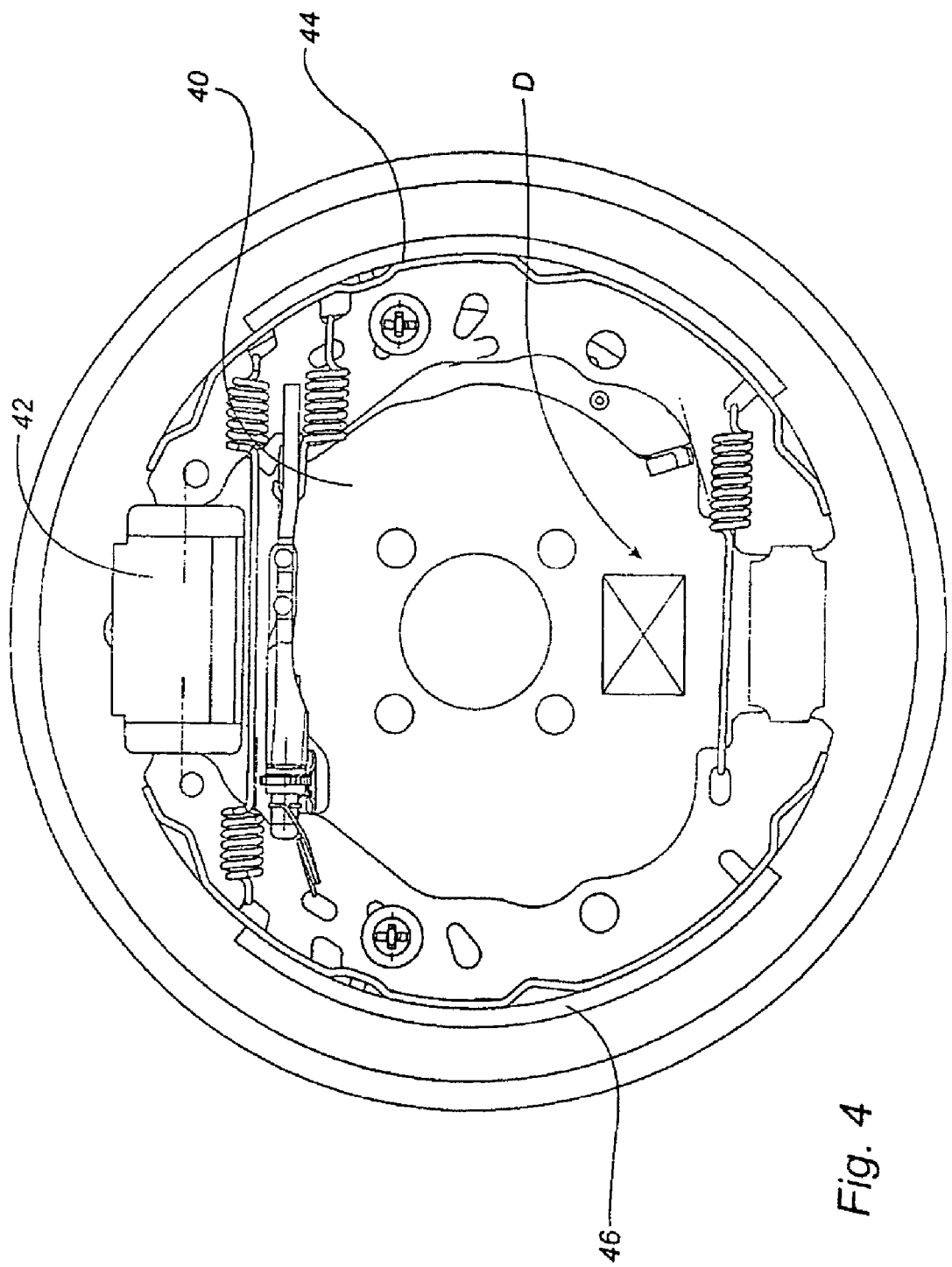
FIG. 4 is an overall view of a drum brake equipped with a device according to the present invention.

FIG. 4 shows a drum brake according to the present invention comprising a plate 40 equipped with a brake cylinder 42 able to move first and second shoes 44, 46, provided with linings, towards a drum (not depicted) secured to the wheel of the motor vehicle; the wheel cylinder is for example actuated by a pressurized hydraulic fluid.

The anti-vibration device D according to the present invention is, in the example depicted, fixed to the plate.

Of course, several anti-vibration devices according to the present invention may be provided for one and the same system that needs to be damped.

Of course, the device according to the present invention applies to any type of structure requiring the damping of vibrations to which it is subjected, for example a machine tool.

The present invention applies particularly to motor vehicle braking systems.

What is claimed is:

1. An anti-vibration device fixed to a structure, comprising a means of fixing the said device to the said structure, the fixing means including a fixing member fixed to the structure, a mass independent from the fixing means and mounted around the fixing member and a means pressing the said mass against the structure with a predetermined force, characterized in that the device also comprises means intended to increase friction forces between the fixing member and the mass, thereby increasing the friction forces between the structure and the mass, the means intended to increase friction forces between the fixing member and the mass comprising at least one pair of opposing surfaces borne one by the mass and one by the fixing member, said opposing surfaces being formed by a screw thread formed on the fixing member and by a tapped thread formed in the mass.

2. The anti-vibration device according to claim 1, characterized in that the means pressing the said mass against the structure with a predetermined force to the mass to bring it into contact with the structure is an elastic means.

3. The anti-vibration device according to claim 2, characterized in that the elastic means is a helical spring.

4. The anti-vibration device according to claim 3, characterized in that the fixing means is a screw screwed by a first end into the said structure and equipped at a second, opposite, longitudinal end, with a head, and in that the helical spring is mounted to provide reaction between the head and the mass.

5. The anti-vibration device according to claim 4, characterized in that the screw comprises a threaded shank, the head being formed of a nut threaded onto the second longitudinal end, the nut being threadedly adjustable so that the load on the spring can be adjusted.

6. The anti-vibration device according to claim 5 for use in a motor vehicle brake comprising a body and means of pressing at least one friction pad against an element made to rotate by the wheel of the motor vehicle.

7. The anti-vibration device according to claim 6, characterized in that the brake is a disk brake, in that the element made to rotate is a brake disk and in that the anti-vibration device is fixed to a carrier and/or a caliper of the disk brake.

8. The anti-vibration device according to claim 6, characterized in that the brake is a drum brake, in that the element made to rotate is a drum and in that the anti-vibration device is fixed to the plate.

9. A motor vehicle brake comprising a body, means of pressing at least one friction pad against an element made to rotate by a wheel of the motor vehicle, and an anti-vibration device fixed on the body, the anti-vibration device including a means of fixing the said device to the body, the fixing means including a fixing member fixed to the body, a mass independent from the fixing means, a means pressing the mass against the body with a predetermined force, and means intended to increase friction forces between the fixing member and the mass, thereby increasing the friction forces between the body and the mass, the means intended to increase friction forces between the fixing member and the mass comprising at least one pair of opposing surfaces borne one by the mass and one by the fixing member, said opposing surfaces being formed by a screw thread formed on the fixing member and by a tapped thread formed in the mass.

10. A brake according to claim 9, characterized in that the brake is a disk brake, in that the element made to rotate is a brake disk and in that the anti-vibration device is fixed to a carrier and/or a caliper of the disk brake.

11. A brake according to claim 9, characterized in that the brake is a drum brake, in that the element made to rotate is a drum and in that the anti-vibration device is fixed to a plate.

12. An anti-vibration device fixed to a structure, the device comprising a fixing member fixed to the structure, a mass independent from the fixing member, means pressing the mass against the structure with a predetermined force to create friction forces between the structure and the mass, which friction forces deaden vibration of the structure, and means creating friction forces between the fixing member and the mass to further deaden vibration of the structure, the means creating friction forces between the fixing member and the mass comprising a screw thread formed on the fixing member and a tapped thread formed in the mass.

13. The anti-vibration device of claim 12 wherein the structure and the mass have abutting generally planar surfaces, wherein the means pressing the mass against the structure presses the abutting surfaces against each other, and wherein the means creating friction forces between the fixing member and the mass include opposing surfaces on the fixing member and on the mass, wherein the opposing surfaces on the fixing member and on the mass are not perpendicular to the abutting surfaces of the structure and the mass.

14. The anti-vibration device of claim 13 wherein the fixing member extends generally perpendicular to the abutting surfaces of the structure and the mass.

15. The anti-vibration device of claim 14 wherein the fixing member is threaded into the structure.

16. The anti-vibration device of claim 15 wherein the means pressing the mass against the structure includes a helical spring surrounding the fixing member and pressing against the mass.

17. The anti-vibration device of claim 16 wherein the means pressing the mass against the structure also includes a nut threaded onto the fixing member, and wherein the helical spring extends between the nut and the mass.

18. Anti-vibration device able to be fixed to a structure, the device comprising:
- a means of fixing said device to the said structure;
- a mass independent from and mounted around said fixing means;
- a means pressing said mass against the structure with a predetermined force; and
- means intended to increase friction forces between the fixing means and the mass which comprise at least one pair of opposing surfaces borne one by the mass and one by the fixing means, said surfaces being formed by a screw thread formed on the fixing means and by a tapped thread formed in the mass.

* * * * *